United States Patent [19]
Duggan et al.

[11] Patent Number: 5,524,107
[45] Date of Patent: Jun. 4, 1996

[54] MULTIPORT MULTIDROP DIGITAL SYSTEM

[75] Inventors: Robert J. Duggan, Monroe; Tat N. Ho, New Milford, both of Conn.

[73] Assignee: General DataComm, Inc., Middlebury, Conn.

[21] Appl. No.: 196,173

[22] PCT Filed: Aug. 21, 1992

[86] PCT No.: PCT/US92/07030

§ 371 Date: May 2, 1994

§ 102(e) Date: May 2, 1994

[87] PCT Pub. No.: WO93/04541

PCT Pub. Date: Mar. 4, 1993

[51] Int. Cl.$^6$ .................... H04J 3/14; H04J 3/06
[52] U.S. Cl. .............. 370/17; 370/80; 370/85.8; 370/101; 340/825.08; 340/825.14; 340/825.21
[58] Field of Search ............. 370/80, 85.8, 95.2, 370/100.1, 101, 17; 340/825.08, 825.06, 825.14, 825.21

[56] References Cited

U.S. PATENT DOCUMENTS 4,653,049  3/1987  Shinmyo ..................... 370/103 X
4,660,195  4/1987  Hatabe ............................. 370/92
4,726,017  2/1988  Krum et al. ...................... 370/85.8
4,858,230  8/1989  Duggan ........................... 370/85.8
5,177,739  1/1993  Basnuevo et al. ............... 370/85.8

*Primary Examiner*—Douglas W. Olms
*Assistant Examiner*—Russell W. Blum
*Attorney, Agent, or Firm*—David P. Gordon

[57] ABSTRACT

A polled digital multiport, multidrop system is described. The inbound frame for sending information from remote terminals to the host terminals is arranged such that a plurality of bytes are provided by a first terminal, followed by a guard band, followed by a plurality of bytes provided by a second terminal, followed by another guard band, etc. The guard band permits signalling between the DSU and the OCU which in turn permits the OCU to signal the MJU that no data will be coming from the OCU. In this manner, control mode idle is accomplished and data mode idle is avoided. In addition, because of the guard band, if the delay from a remote site changes, no data will be lost. Means for monitoring the system to follow changes in delay are also provided, and the system can cause a remote location to accommodate a change in delay.

20 Claims, 9 Drawing Sheets

OUTBOUND (MASTER-TO-REMOTE) AGGREGATE FRAMING FORMAT

INBOUND (REMOTE-TO-MASTER) FRAMING FORMAT

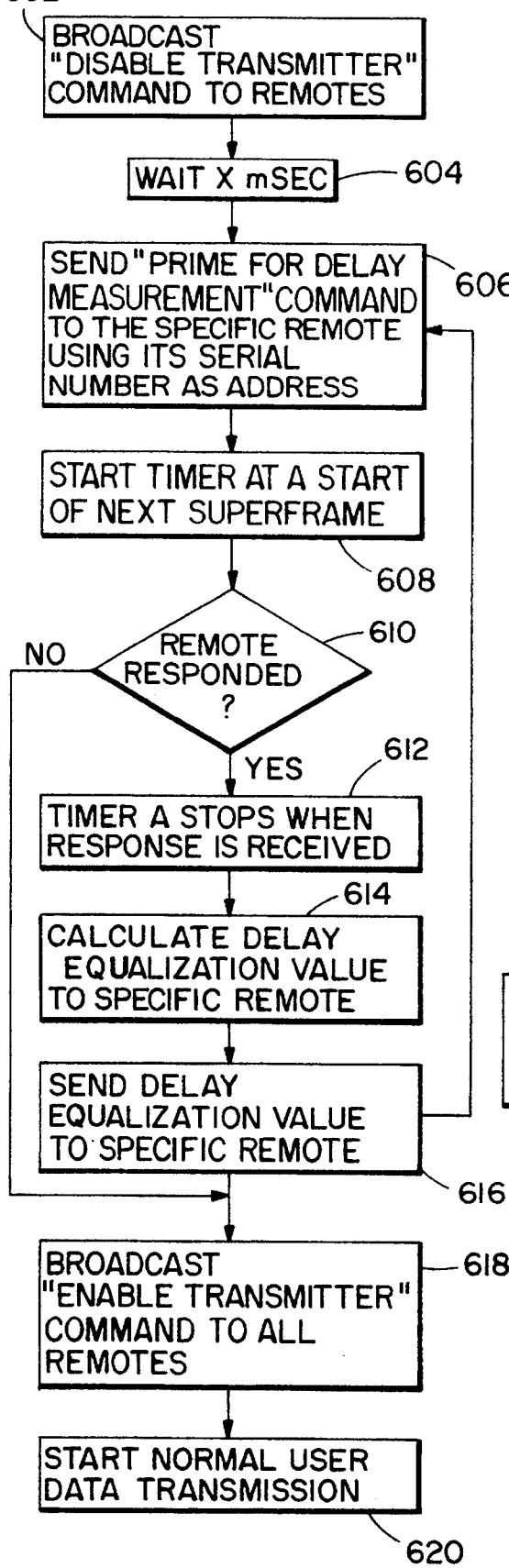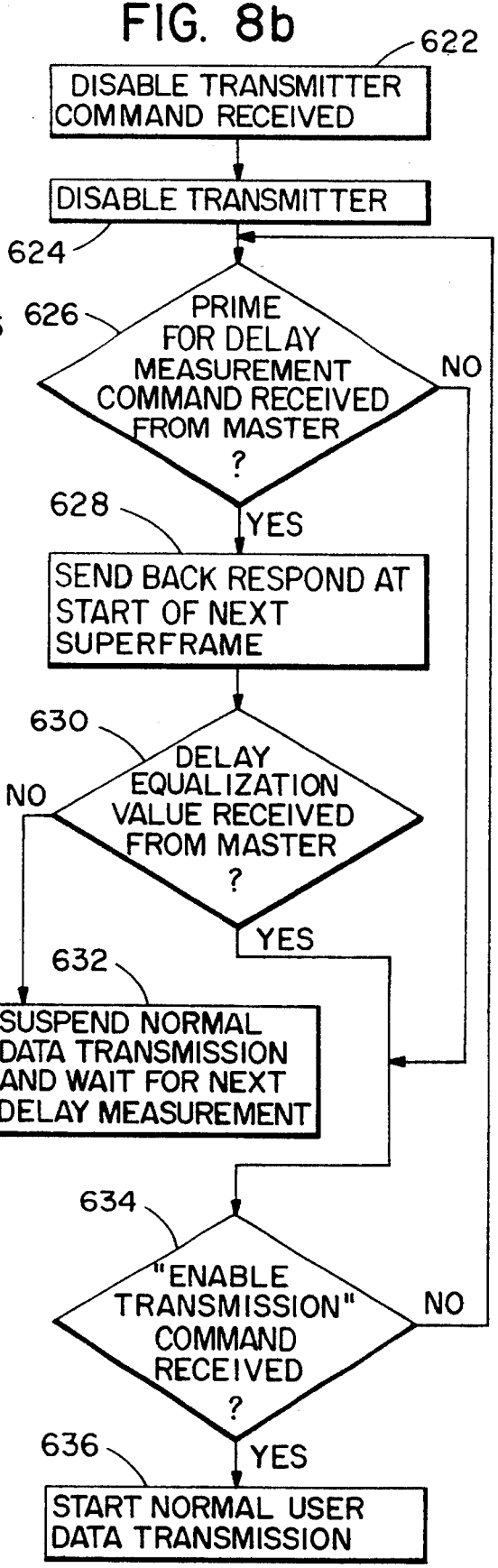

MULTIPORT MULTIDROP DIGITAL SYSTEM

BACKGROUND OF THE INVENTION

This application is related to U.S. Ser. No. 07/749,897, abandoned, which is hereby incorporated by reference in its entirety herein.

1. Field of the Invention

This invention relates generally to telecommunications systems. More particularly, it relates to digital multiport multidrop systems where a plurality of hosts are coupled via a single line to a digital telecommunications network and communicate with data terminals, where a first group of data terminals are coupled via a first single line to the digital telecommunications network and a second group of terminals are coupled via a second single line to the digital telecommunications network.

The invention is particularly applicable in the banking industry where it may be desirable for banks to have information from tellers, ATMs and security systems on a single line at various branches communicating with separate hosts for tellers, ATMs and security systems at a single different location.

2. State of the Art

Different multiport multidrop systems have been proposed. U.S. Pat. No. 4,858,230 to Duggan, for example, discloses an analog system where outbound messages from hosts are multiplexed and sent on a constant carrier over a single line to data terminals. Return messages from data terminals are similarly sent. However, since only one data terminal can use the line at any given time, responses from different terminals need to be delayed.

Recently, digital multiport multidrop systems have been proposed by Racal-Milgo and Paradyne. Digital systems do not use a carrier. Rather, as suggested by prior art FIG. 1, data from multiple hosts 12a, 12b, 12c are multiplexed by a multiplexer 14 and are output by a data service unit (DSU) 16 in digital format to the digital network 22. The digital network, which is maintained by the telephone company, includes a number of office channel units (OCUs) 24a, 24b, 24c, 24d, etc. and at least one multiple junction unit (MJU) 28. The MJU combines data from the OCUs (e.g., 24b, 24c, 24d) based on information supplied to the MJU through the OCU. The OCU tells the MJU whether the OCU is in data send mode or in an idle mode (based on whether the OCU 24 is receiving data from any of the drops 42a–42i of ports 43a–43c via multiplexer/demultiplexers 44a–44c and DSUs 36a–36c). There are essentially two ways in which the OCUs can tell the MJU which branches are idle. These are referred to as "polling disciplines", as defined in AT&T Publication 62310, page 27 (1987).

The two known polling disciplines are often referred to as "data mode idle" and "control mode idle". In the case of data mode idle, OCUs signal an idle state by transmitting continuous digital ones. Data bits received by an MJU from the OCUs are combined in a logical AND so that all of the OCUs supplying continuous logical ones are effectively idle and the OCU supplying a varying bit stream of ones and zeros is passed through by the MJU. Data mode idle has a disadvantage, though. If there is a bit error from any one of the idle OCUs, it is combined with the data stream from the active OCU and thus, the opportunity for corrupted data is enhanced. Control mode idle avoids the possibility of data corruption by consigning the MJU to ignore idle channels. In control mode idle, an OCU signals the MJU that it is idle via network signalling known in the art. So long as the idle sequence is received, data from that OCU is ignored (i.e., not ANDed).

In any polled application, it is the responsibility of the control (master) station to guarantee that only one tributary station (remote terminal) responds at any one time. Therefore, it is true to say that Drop-1 channel-1 will always be inactive while Drop-2 channel-1 is responding or vice versa. But with a number of independent applications running simultaneously, one at each channel, collision between channels (e.g. Drop-1 channel-1 and Drop-2 channel-2) is a real possibility.

SUMMARY OF THE INVENTION

It is therefore an object of the invention to provide a substantially error-free polled digital multiport multidrop system.

It is another object of the invention to provide a digital multiport multidrop system which utilizes a control mode idle polling discipline.

It is a further object of the invention to provide a digital multiport multidrop system which utilizes a framing scheme which multiplexes groups of bytes from each data terminal and which separates these groups of bytes with at least one guard band byte.

Another object of the invention is to provide a digital multiport multidrop system which monitors the delay in signals from data terminals and adaptively adjusts accordingly. In accordance with these objects, a digital polled multiport multidrop system which utilizes a public digital telecommunications network is provided and generally comprises a multiplexer/demultiplexer for receiving outbound information from a plurality of hosts and for providing a time division multiplexed output to a data service unit and for receiving inbound information via the data service unit from a number of remote sources and demultiplexing the inbound information for the hosts, and a microprocessor for controlling the multiplexer/demultiplexer to multiplex outbound information from the hosts according to a first frame and for demultiplexing inbound information from the data service unit according to a second frame. The second frame is designed such that one or more of bytes of data are received from a particular remote source followed by at least one guard band byte followed by one or more of bytes of data from another remote source. The remote sites are polled by the microprocessor to determine different delays between the host and the remote sites. In response to a measured delay, the remote sites are programmed by the microprocessor to send data at desired times so that synchronized time division multiplexing is maintained. While this synchronization technique is obvious to one skilled in the art, the present invention also provides continuous monitoring of the time delay so that synchronization can be constantly maintained and corrected "on-the-fly". The guard band of the invention permits "on-the-fly" corrections as it is capable of absorbing bit slips.

The guard band may include a bipolar violation which is passed by a remote DSU to an OCU and is used by the OCU to inform the MJU whether the OCU is sending data. That is, the guard band can contain a bipolar violation, if the following time slot does not contain data from a remote terminal. The guard band also helps prevent errors associated with time delays at remote terminals. With the guard band in place, if the timing of a remote terminal slips so that it is sending data either too early or too late, it will be sending data during the guard band interval, the data will interfere with the guard band, but not with other incoming data. If the guard band comprises a plurality of marks (digital ones), the worst case situation will be that the system operates in data mode idle until the slippage of the remote terminal is corrected.

If data is received during a guard band interval, the master microprocessor will determine that there has been a change in delay from a remote terminal. In order to determine which remote terminal has changed delay, the microprocessor monitors incoming and outgoing frames. The frames are constructed with one or more bytes of control information which includes substantially continuous polling of the remote units to determine delay. The microprocessor informs the delayed remote unit to change its timing and this information is included in the control information portion of the frame. In order that the guard band not utilize too much bandwidth, a plurality of bytes from a remote terminal are sent between guard bands.

Additional objects and advantages of the invention will become apparent to those skilled in the art upon reference to the detailed description taken in conjunction wit the accompanying drawings.

BRIEF DESCRIPTION OF THE DRAWINGS

FIGS. 8a and 8b are flowcharts of the delay measurement procedures of the master and remote units upon power up.

DETAILED DESCRIPTION OF THE PREFERRED EMBODIMENT

Figure 1:
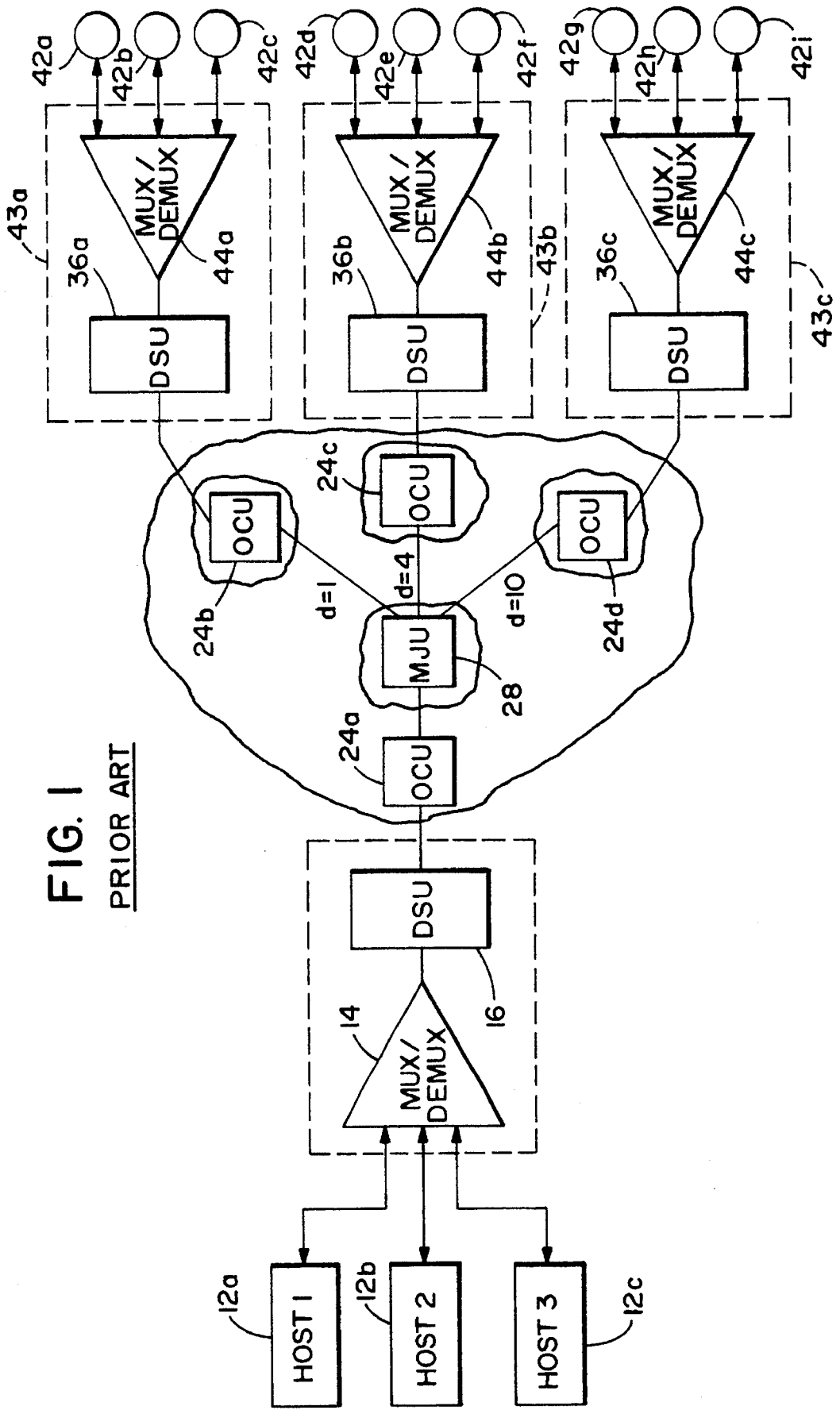
FIG. 1 is a prior art drawing of a digital multiport multidrop system which interfaces with a digital telecommunications network.
Figure 2:
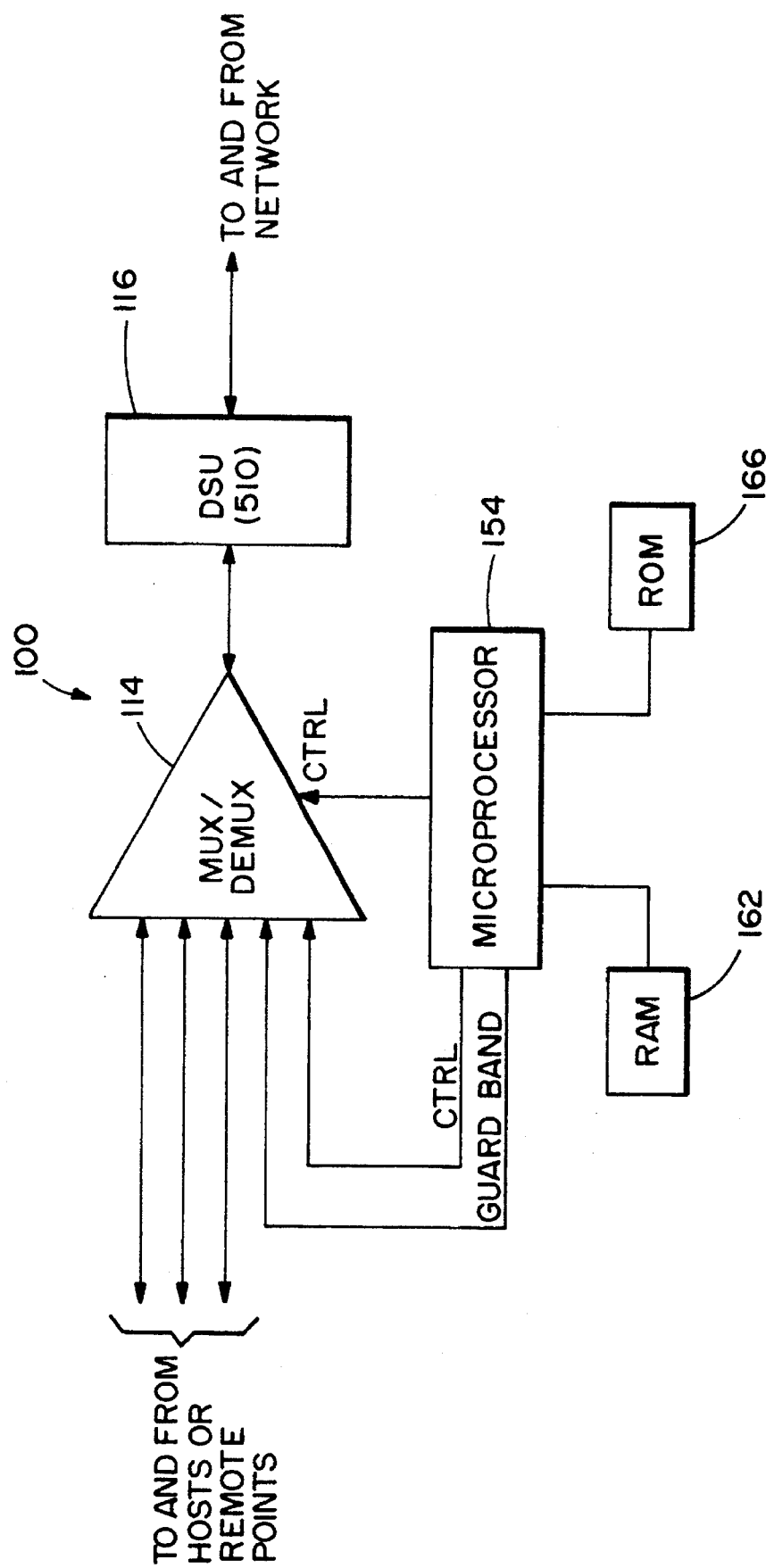
FIG. 2 is a representative functional block diagram of a component which is used at the master and at each remote to implement the polled digital multiport multidrop system of the invention.

The basic building block or component 100 of the invention is seen in FIG. 2. As shown, the component (which is also referred to as the NMS 464) comprises a multiplexer/demultiplexer 114, a microprocessor 154 with accompanying RAM 162 and ROM 166, and a DSU 116. The DSU is well known in the art, and is sold by the assignee of the present application as General DataComm, Inc. NMS 510. Component 100 is utilized for both the master (host) site and the remote sites, and as shown in FIG. 2 is generic. The microprocessor 154 controls the multiplexer/demultiplexer 114 according to a program which can be stored in ROM 166. Where the component 100 is used in conjunction with the master site, the multiplexer multiplexes data from the host terminals in accord with control information generally generated by the microprocessor. However, where the component 100 is used in conjunction with remote sites, the multiplexer 114 not only multiplexes data from different terminals together with control information, but also multiplexes a guard band which is described in detail below.

Figure 3:
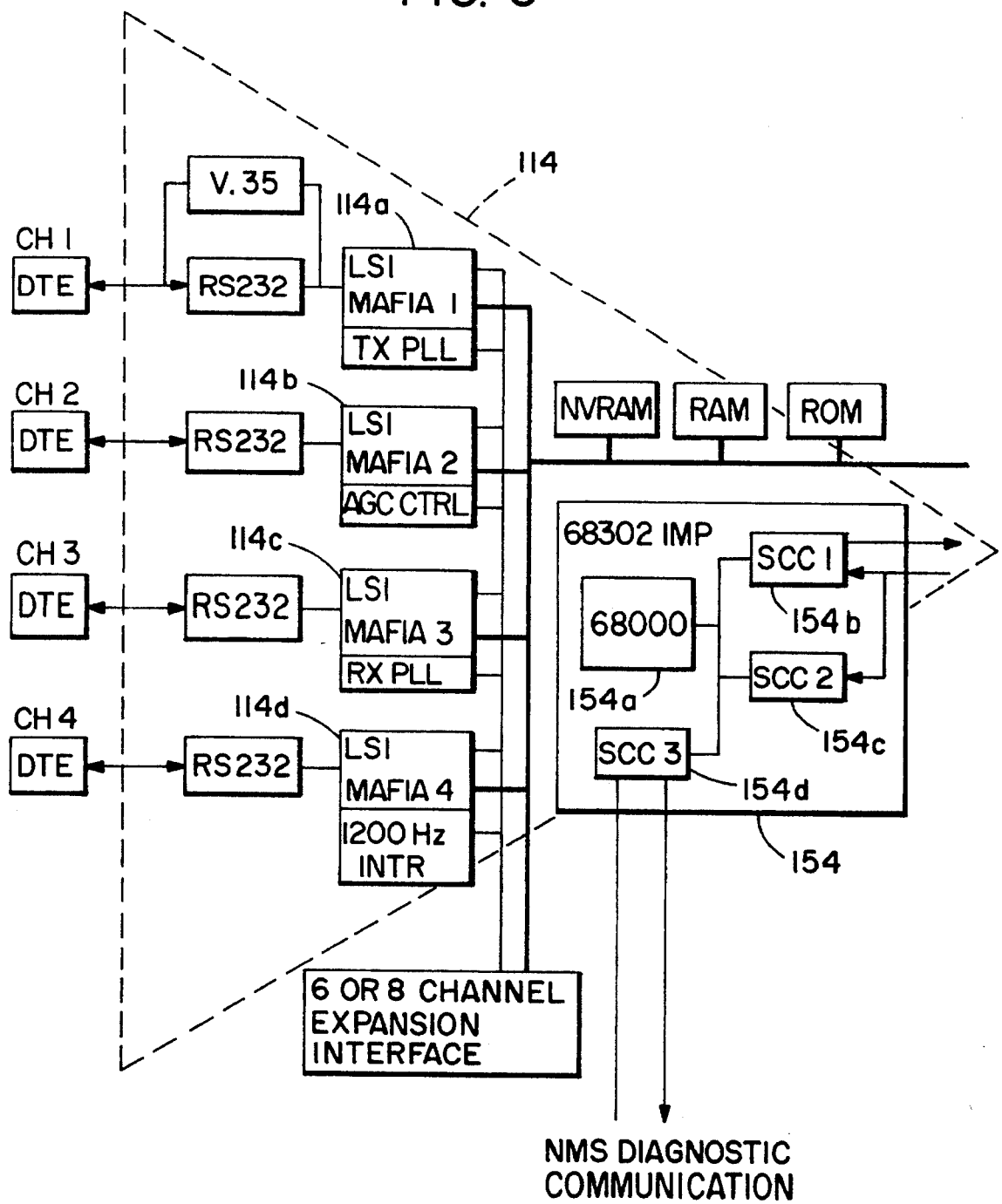
FIG. 3 is a more detailed block diagram of a portion of the component of FIG. 2.

Referring now to FIG. 3, additional features of the non-DSU portion of component 100 are seen in more detail. As shown, microprocessor 154 is preferably a 68302 microprocessor package having a 68000 microprocessor and several parallel to serial and serial to parallel converters 154b, 154c, 154d. The multiplexer/demultiplexer 114 is preferably constructed of several LSIs 114a, 114b, 114c, 114d which are used for various multiplexer functions well known in the art.

Figure 4:
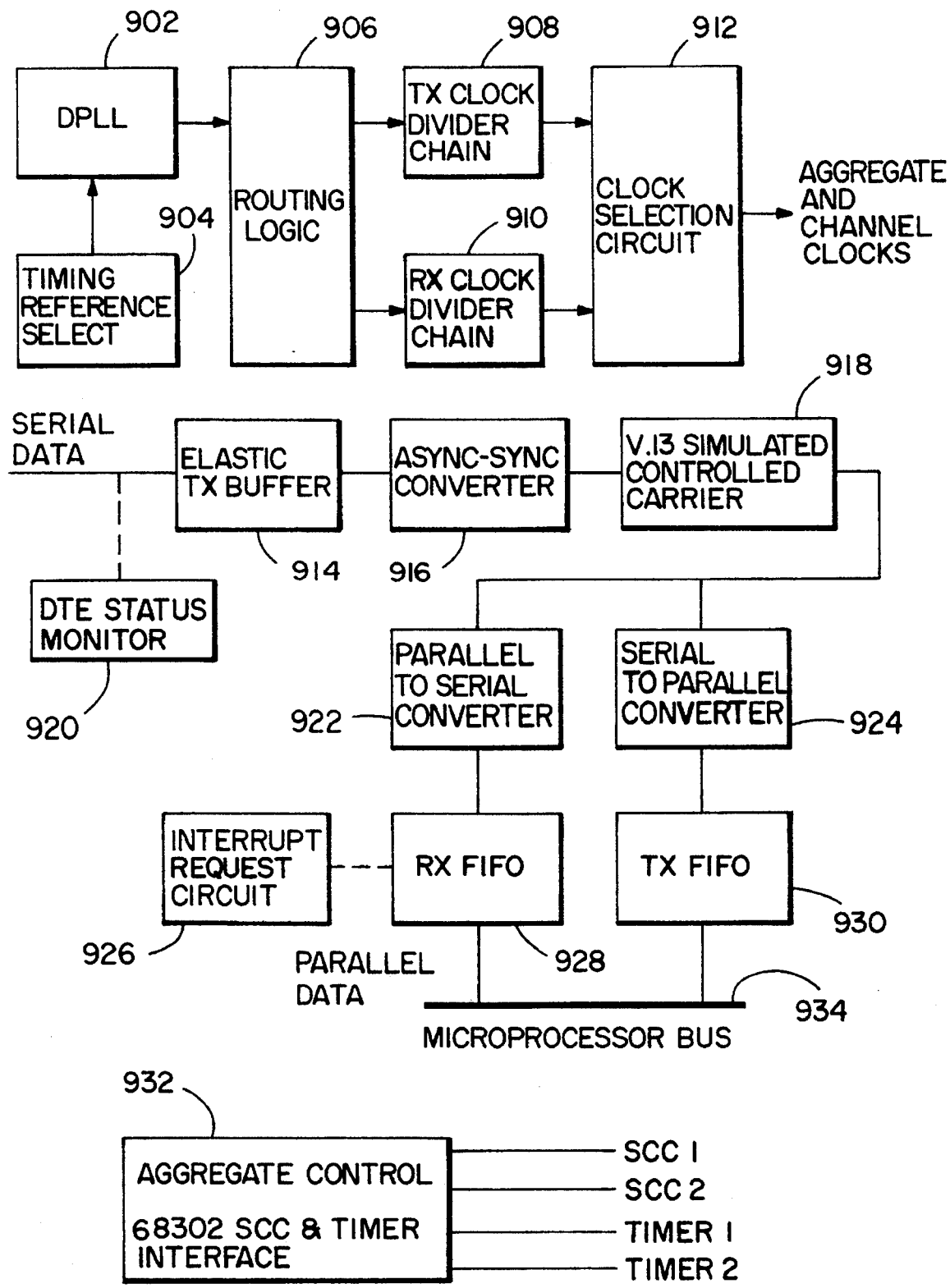
FIG. 4 is a block diagram of the custom LSI used in construction of the component shown in FIGS. 2 and 3.

The LSI chips are manufactured by the assignee of the present application and are designated "MAFIA (Multiplexer Asynchronous FIFO Interface Adapter) Custom LSI Chip". FIG. 4 shows a basic block diagram of the MAFIA chip. The MAFIA LSI can be divided into five main functional blocks: PLL and Baud Rate Generation (902–912); Aggregate SCC Control 932; Data Path (914, 916, 918, 922, 924, 928, 930); DTE Status Monitor 920; and Microprocessor Control (926).

The PLL and Baud Rate Generation generally includes one PLL 902 and two independent timing chains 908, 910 connected by routing logic 906. The timing chains may also be driven by external phase-locked high frequency clocks.

The Digital Phase Lock Loop 902 operates from a master clock source of 16.128 MHz which is provided externally and which may be selectively divided by a timing reference select 904.

The baud rate generators must generate four different clocks as selected at the block selection circuit 912: Aggregate Transmit Clock; Channel Transmit Clock; Channel Receive Clock; and an Independent Supplementary clock. The Aggregate Control 932 is the interface with the 68302 multi-protocol processor referred to above. It functions as a dedicated interface to the serial communication controllers, SCC1 and SCC2 and timers of the 68302.

The Data Path is where the serial user data passes through the LSI. It performs two main functions: Async to Sync conversion 916 and V.13 simulated controlled carrier 918.

The Async-Sync Converter 916 inserts or deletes stop bits to handle overspeed or underspeed situations when input data from the DTE is asynchronous and must be re-synchronized to the system's internal bit clock.

The V.13 Simulated Controlled Carrier 918 is described in CCITT recommendation V.13. Serial—Parallel conversion is provided by 922 and 924 because data is processed by the multiplexer in eight bit bytes and user data is in serial form. Part of the conversion requires In and Out FIFO buffers 928 and 930.

To allow flexible external clocking of transmit data, an elastic buffer 914 is provided in the data path. The range of elasticity should be ±8 bits and the size of the buffer should be 16 bits.

In order to support many diagnostic functions it is necessary that signals at the DTE be monitored. To accommodate this need, activity monitors such as the DTE Status Monitor 920 shown in FIG. 4 are provided. These monitors are essentially edge triggered latches which will capture a transition and remain in state until reset by the microprocessor.

The MAFIA LSI is designed to interface to a microprocessor through an 8-bit bus 934. The LSI has 15 write registers and 4 read registers to enable the host microprocessor to control every function of the LSI circuit. The MAFIA LSI provides an interrupt request output 926 for interfacing with the host microprocessor.

The multiplexer is a time division multiplexer which works with packets of bytes. It has a storage facility and is programmed according to a frame where packets of bytes are taken from one source before packets of bytes are taken from another source.

Figure 5:
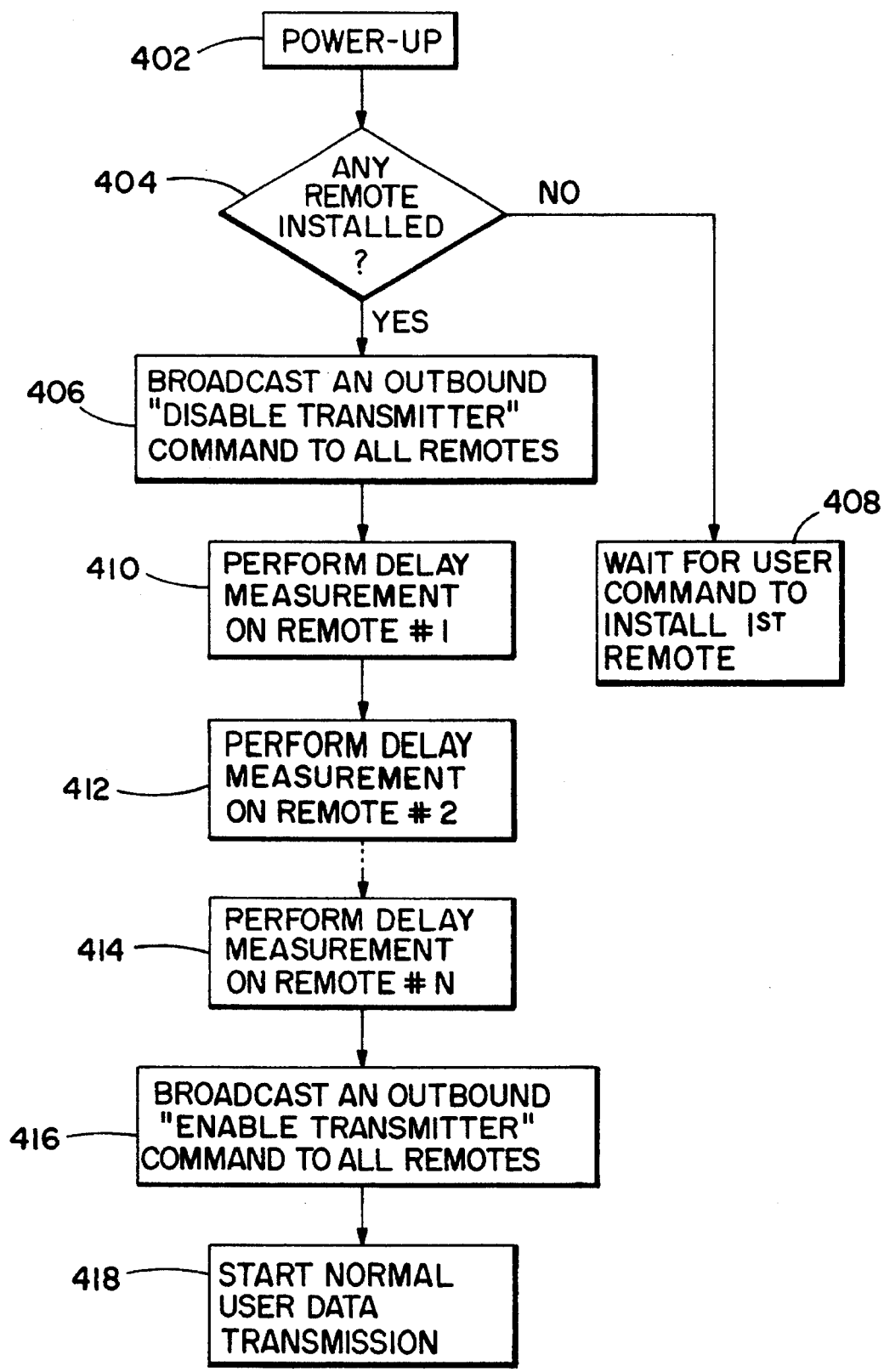
FIG. 5 is a flowchart of the master unit component power up procedure.
Figure 6:
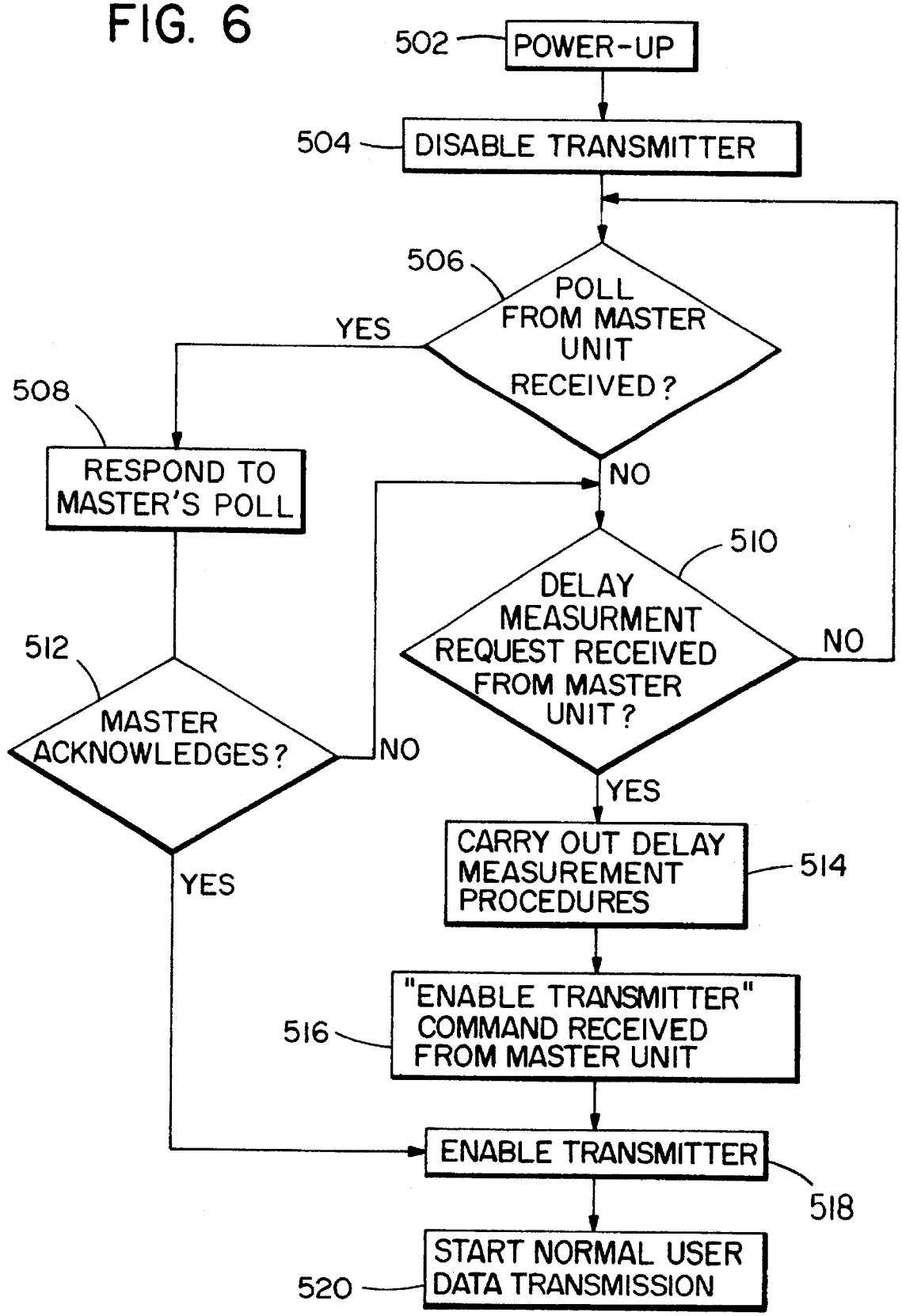
FIG. 6 is a flowchart of the remote unit component power up procedure.

FIGS. 5 and 6 show the different start-up procedures for component 100 when used as master or remote units. During the start-up procedure, the master and remote units cooperate in order to permit a measurement of delay.

Referring now to FIG. 5, the master unit upon power-up 402 determines if any remotes are installed 404. If not, it waits for a user command 408 to install the first remote. If remotes are installed, the master broadcasts an outbound "Disable Transmitter" command 406 to all remotes. The master then performs delay measurements 410, 412, 414 (described below) on each remote.

After all delay measurements are made, the master broadcasts an outbound "Enable Transmitter" command 416 to all remotes and normal user data transmission 418 begins.

Referring now to FIG. 6, the remote unit on power-up 502 first disables its transmitter 504 waits for a poll from the master 506. If it does receive a poll from the master, it responds 508 and if the master acknowledges 512, the remote enables its transmitter 518 and begins normal operation 520. If no poll from the master unit is received 506 or if the master does not acknowledge 512 the response by the remote 508 to the master's poll, the remote waits for delay measurement request 510. If no delay measurement request is received 510, the remote again waits for a poll from the master unit 504. If a delay measurement request is received from the master 510, delay measurement is performed 514 and the remote waits for the "enable transmitter' command 516 from the master. When the command is received, the remote enables its transmitter 518 and begins normal operation 520.

The delay measurement procedures for the master and remote units upon power-up are shown in more detail in FIGS. 8a and 8b, respectively and described below in the discussion of Propagation Delay Compensation. The delay measurement is used to provide information about the time delay of the different remote units so that data sent from the remote units can be synchronized one relative to the other. Since each remote site might experience different delay and data from a plurality of sites is to be time division multiplexed, account must be made for the delay from each site. As mentioned above, the basic technique of synchronizing the remote sites to account for delay is known in the art.

Figure 7A:
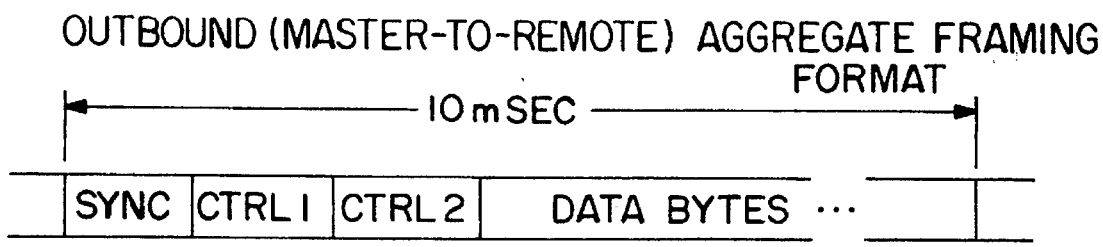
FIGS. 7a and 7b are framing format diagrams of the outbound (master to remote) frame and the inbound (remote to master) frame.

Turning to FIG. 7a, the framing of outbound data is shown. The outbound frame is assembled in a generally standard manner and is preferably 10 msec in length. It includes sync and control information in addition to data from one or more channels. Outbound frames are transmitted continuously or in what is referred to as "constant carrier mode". The number of bytes in an outbound frame is determined by the data rates of the channels. For example, the table below indicates the number of bytes generated by a channel in 10 msec at data rates from 2.4 kbps to 64.0 kbps:

| Data Rate | Bits/10 msec | Bytes/10 msec |
|---|---|---|
| 2.4k | 24 | 3 |
| 4.8k | 48 | 6 |
| 7.2k | 72 | 9 |
| 9.6k | 96 | 12 |
| 12.0k | 120 | 15 |
| 14.4k | 144 | 18 |
| 16.8k | 168 | 21 |
| 19.2k | 192 | 24 |
| 38.4k | 384 | 48 |
| 56.0k | 560 | 70 |
| 64.0k | 640 | 80 |

If for example, the outbound frame is to contain data from 4 channels and the data rates of the 4 channels are 9.6 kbps, 2.4 kbps, 2.4 kbps, and 38.4 kbps, the aggregate data stream must have a rate of 56 kbps. This means that the outgoing frame may comprise 70 bytes. The total number of data bytes is 66: channel 1 has 12 bytes per frame, channels 2 and 3 each have 3 bytes and channel 4 has 48 bytes. In general, a minimum of 3 bytes are needed for synchronization, Netcon diagnostic and "inband" master-to-remote communication which will be described in more detail below.

The 10 msec aggregate outgoing frame must be assembled before it can be sent. Input buffers for each channel accumulate the appropriate number of bytes needed for each frame cycle. With this input buffer arrangement, it is clear that all input data incur a minimum delay of 10 msec due to the holding time in the buffers. In order to reduce this buffer delay, the 10 msec frame may be further divided into three equal data segments so that the buffer delay that any one channel will suffer is between 3.33 and 6.67 msec. Therefore, in the 4 channel example above, the aggregate outgoing frame structure can be seen in the table below:

| Byte 1 | FRAME sync byte | |
|---|---|---|
| Byte 2 | Netcon/Control BYTE_1 | Sync Header |
| Byte 3 | Netcon/Control BYTE_2 | |
| Byte 4 | Not used | |
| Byte 5 | Channel 2 data | |
| Byte 6 | Channel 3 data | |
| Byte 7 | Channel 1 data | |
| Byte 8 | Channel 1 data | Data Segment 1 |
| Byte 9 | Channel 1 data | (21 bytes) |
| Byte 10 | Channel 1 data | |
| Byte 11 | Channel 4 data | |
| Byte 12 | Channel 4 data | |
| . | | |
| Byte 25 | Channel 4 data | |
| Byte 26 | Channel 4 data | |
| Byte 27 | Channel 2 data | |
| Byte 28 | Channel 3 data | |
| Byte 29 | Channel 1 data | |
| Byte 30 | Channel 1 data | Data Segment 2 |
| Byte 31 | Channel 1 data | (21 bytes) |
| Byte 32 | Channel 1 data | |
| Byte 33 | Channel 4 data | |
| Byte 34 | Channel 4 data | |
| . | | |
| Byte 47 | Channel 4 data | |
| Byte 48 | Channel 4 data | |

| | | |
|---|---|---|
| Byte 49 | Channel 2 data | |
| Byte 50 | Channel 3 data | |
| Byte 51 | Channel 1 data | |
| Byte 52 | Channel 1 data | Data Segment 3 |
| Byte 53 | Channel 1 data | (21 bytes) |
| Byte 54 | Channel 1 data | |
| Byte 55 | Channel 4 data | |
| Byte 56 | Channel 4 data | |
| . | | |
| . | | |
| Byte 69 | Channel 4 data | |
| Byte 70 | Channel 4 data | |

It will be appreciated that for channel rates 56 kbps and 64 kbps, the number of bytes, 70 and 80 respectively, are not divisible by 3. To maintain the three data segment division of the frame, one segment may be prearranged to have one byte more than the others. This is not a problem so long as the demultiplexing scheme does exactly the reverse.

The multiplexed frame of 70 bytes shown above is one example. The frame is constructed and transmitted repeatedly. At another aggregate rate, the multiplexed frame may take on different organizations.

At the receiving end of such a multiplexed data stream, the reverse process is performed and the channel data is reassembled. In order to perform this process, it is essential to locate the beginning of each frame. Thus, a known 8-bit pattern is sent as the FRAME SYNC byte at the start of each frame. In the above example, therefore, FRAME SYNC bytes are separated by 70 bytes or 560 bits. As is known in the art, the receiver circuitry is capable of performing some form of auto-correlation on the aggregate signal to obtain synchronization.

The FRAME SYNC byte is preferably constructed so that the probability that some user data appearing identical to it frame-after-frame is sufficiently low. A sample FRAME SYNC byte is shown in the table below:

| | | |
|---|---|---|
| bit 1 | x | Modulo-4 counter |
| bit 2 | x | incremented once per frame |
| bit 3 | 1 | |
| bit 4 | 1 | Fixed |
| bit 5 | 1 | six-bit |
| bit 6 | 0 | pattern |
| bit 7 | 0 | |
| bit 8 | 1 | |

In accordance with the invention, it is desirable that every third outbound frame be designated a Superframe. Superframes will contain control information for synchronization, Netcon and auxiliary communication as described in more detail below.

Figure 7B:
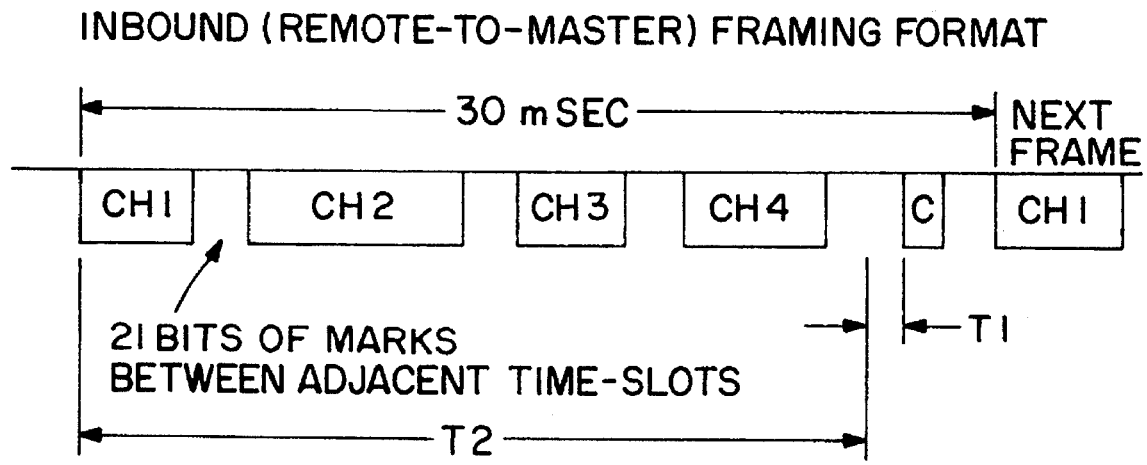

Turning to FIG. 7b, the inbound framing is seen. Because the data contained in the inbound frame is provided in response to polling, it will be appreciated that the inbound frame functions according to a "Switched Carrier Mode". In any polled application, it is the responsibility of the master (control) station that only one tributary station (remote terminal) respond at any one time. Therefore, it is true to say that Drop-1 channel-1 will always be inactive while Drop-2 channel-1 is responding or vice versa. But with a number of independent applications running simultaneously, one at each channel, collision between channels (e.g. Drop-1 channel-1 and Drop-2 channel-2) is a real possibility. In order to prevent data collisions, a standard "time-slicing" scheme is adopted for the inbound (from remote to master) aggregate transmission (frame). For example, given some arbitrary time reference t0=0, a first time slot may be defined as t0 to t1, which can be reserved for responses from channel 1. Similarly, a second time slot t1 to t2 can be reserved for responses from channel 2, etc, until a complete cycle is performed allowing for responses from each channel. This example is shown more clearly in the table below:

| time-slot #1 | time-slot #2 | time-slot #3 | ... | time-slot #n | time-slot #n+1 | time-slot #n+2 | ... |
|---|---|---|---|---|---|---|---|
| ch 1 may respond | ch 2 may respond | ch 3 may respond | ... | ch n may respond | ch 1 may respond | ch 2 may respond | ... |
| One Cycle | | | | | Next Cycle | | |

If one assumes that all inbound propagation delays on this exemplary multipoint line are identical, then by arranging all remote drops to adopt the same time-slicing boundaries, collisions can be avoided.

To establish a common time reference t0 among all remote drops, the outbound signal from the master to the remotes is used. As mentioned above, the outbound signal from the master has a frame cycle of 10 msec. All of the remotes which are receiving the outbound signal, therefore, may derive a common "clock" that ticks once every 10 msec. Moreover, every one out of X (preferably 3) outbound frames contains a tag to identify it as a Superframe. At each remote receiver, Superframe timing information is extracted to establish the time reference t0 for use in the time-slicing scheme described above.

To further enhance collision protection, adjacent channel time-slots are separated by gaps, so that minor jitters of an integer number of bits can be tolerated without resulting in overlapping of adjacent channel responses. Such a scheme of gaps is shown for example in the table below where the gaps are shown with the letter G:

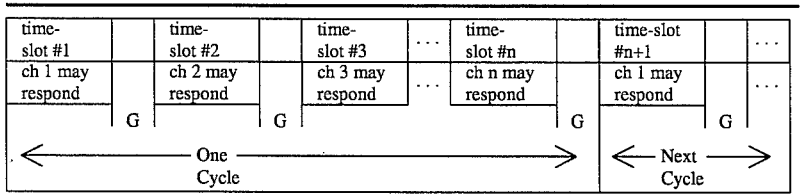

At the receiver of the master multiplexer, the boundaries of channel time-slots are established using the master's own transmit signal Superframe timing as reference. The gaps between time slots are preferably 3 bytes and 21 bits of those three bytes are designated as the guard band. As mentioned above, the guard band enhances collision protection, but also enables the efficient use of "control mode idle", prevents errors during bit slippage of a remote port, and provides means for "on-the-fly" correction of time delay of remote ports.

The guard band is normally 21 marks, i.e. twenty-one bits, all 1. The remaining 3 bits in the 3 byte gap distinguish whether the time slot following the gap is the start, middle or end of a channel response. The first bit (bit__6 of the third byte) works like a "start bit" and is always set to "0" if there is data present. The second and third bits (bit__7 and bit__8 of the third byte) are used as status flags to inform the receiver of the following conditions:

| bit__7 | bit__8 | The subsequent data carried in this |
|---|---|---|
| 0 | 0 | time-slot is a complete response |
| 0 | 1 | the start of a response |
| 1 | 0 | the middle section of a response |
| 1 | 1 | the end section of a response |

These last two bits of the third byte in the gap are normally followed by an 8-bit "byte count" at the start of each time slot which informs the receiver of the length of the subsequent data stream. When bit__7=1 and bit__8=0, however, the byte count can be omitted since it is apparent that the data stream spans the entire time-slot. Additional "byte count" bytes may be needed for high data rates.

It can be seen that the gaps between time-slots consume bandwidth. To minimize loss and maximize bandwidth efficiency, therefore, the inbound frame time cycle should be as long as possible. On the other hand, if the time cycle of the inbound frame is too long, transaction response time is increased. A compromised value of 30 msec is preferred. In the four channel example described above with reference to the outbound frame, a 30 msec inbound frame can comprise 1680 bits (56×30) or 210 bytes of data. An illustration of the organization of such an inbound multipoint frame is shown below where the binary representations in Bytes 3, 24, 36, 48, and 207 are shown LSB first:

| | |
|---|---|
| Byte 1 | FF hex, start of 21-bit guard band |
| Byte 2 | FF hex, |
| Byte 3 | SS011111 bin, 0=start of data, SS are status flags |
| Byte 4 | "Byte Count" or data byte 1 |
| Byte 5 | Channel 1 data byte 1 or 2, (4.8 kbps) |
| . | . |
| . | . |
| Byte 21 | Channel 1 data byte 17 or 18 |
| Byte 22 | FF hex, start of 21-bit guard band |
| Byte 23 | FF hex, |

-continued

| | |
|---|---|
| Byte 24 | SS011111 bin, 0=start of data, SS are status flags |
| Byte 25 | "Byte Count" or data byte 1 |
| Byte 26 | Channel 2 data byte 1 or 2 (2.4 kbps) |
| . | . |
| . | . |
| Byte 33 | Channel 2 data byte 8 or 9 |
| Byte 34 | FF hex, start of 21-bit guard band |
| Byte 35 | FF hex, |
| Byte 36 | SS011111 bin, 0=start of data, SS are status flags |
| Byte 37 | "Byte Count" or data byte 1 |
| Byte 38 | Channel 3 data byte 1 or 2 (2.4 kbps) |
| . | . |
| . | . |
| Byte 45 | Channel 3 data byte 8 or 9 |
| Byte 46 | FF hex, start of 21-bit guard band |
| Byte 47 | FF hex, |
| Byte 48 | SS011111 bin, 0=start of data, SS are status flags |
| Byte 49 | "Byte Count" or data byte 1 |
| Byte 50 | Channel 4 data byte 1 or 2 (38.4 kbps) |
| . | . |
| . | . |
| Byte 192 | Channel 4 data byte 143 or 144 |
| Byte 193 | FF hex, 6 more bytes of marks reserved for use as "gaps" for two or more additional channels |
| . | . |
| . | . |
| Byte 198 | FF hex |
| Byte 199 | Not used, (1.6k of bandwidth is not used) |
| . | . |
| . | . |
| Byte 204 | Not used |
| Bute 205 | FF hex, start of 21-bit guard band |
| Byte 206 | FF hex, |
| Byte 207 | SS011111 bin, 0=start of data, SS are status flags |
| Byte 208 | Control/Diagnostic Channel data byte 1 |
| Byte 209 | Control/Diagnostic Channel data byte 2 |
| Byte 210 | Control/Diagnostic Channel data byte 3 |

FIG. 7b shows this arrangement of the inbound data frame in a schematic way and also shows an additional control channel C sent at the end of each frame. In the frame described above, the control channel is the last 3 bytes of the frame (Bytes 208–210 in the table above). The control channel, like the data channels, is bracketed with gaps including guard bands. The control or diagnostic data time slot shown in FIG. 7b may be used as shown in the flow chart of FIG. 9 (which is discussed in detail below) to monitor delay while data is being sent.

In a real network, propagation delays will be different from drop to drop. These delays must be "equalized" in order for the signals to be synchronized. Equalization is accomplished by a circuit initialization procedure during which each remote drop is polled and propagation delay is measured. The measured values are then sent back to each remote for adjusting the time reference t0. The flow charts in FIGS. 8a and 8b show this procedure generally. Turning now to FIGS. 8a and 8b, the master first at 602 broadcasts a command to disable all remotes (hold mark) and then at 604 waits a reasonable time for all remotes to acquire frame synchronization. the remotes receive the disable transmitter command at 622 and disable their transmitters at 624. Next at 606, the master sends a "prepare for delay measurement" command to a specific remote and waits until the transmission of the next Superframe to start a counter at 608 which is clocked by the aggregate TX clock. Then the master waits at 610 for the remote response. Meanwhile, the remote at 626 receives the "prepare for delay measurement" or if none is received, enables its transmitter at 634. After receiving the "prepare for delay measurement" at 626, the the addressed remote at 628 waits for the next Superframe sync pattern. When the Superframe sync pattern is detected, a response is immediately sent back to the master which receives it at 610. If no response is received by the master at 610, the master broadcasts an enable transmitter command to all remotes at 618. If the master receives the response from the remote at 610, the master stops the counter at 612 and records the count on the counter and calculates the delay equalization value for the specific remote at 614.

The count is proportional to the round-trip propagation delay for the selected remote drop. Based on the measured value, the master at 616 sends back to the remote a Delay Equalization Count which may have the value

| | |
|---|---|
| N - Count, | if Count ≦ N or, |
| 2N - Count, | if Count ≦ 2N or, |
| 3N - Count, | if Count ≦ 3N or, etc. | where N=(3×Aggregate Speed)/100. The value 3 is used here assuming that there is one Superframe for every 3 frames. This is a good value to use since it represents an optimized compromise between Available User Bandwidth and Response Time. The number of Superframes may be different, however, under different circumstances.

The selected remote then receives at 630 the Delay Equalization Count, delays its current time reference t0 by that amount, and waits at 634 for the enable transmitter command from the master. If the remote does not receive a Delay Equalization Count at 630, it suspends normal data transmission and waits at 632 for the next delay measurement. The master repeats the steps at 606 through 616 for each remote and then broadcasts at 618 an "Enable Transmitter" and begins normal operation at 620.

Each remote, after receiving the "Enable Transmitter" at 634 proceed to normal data transmission at 636. If a remote does not receive an "Enable Transmitter" command at 634, it waits at 626 for a "prepare for delay measurement" command from the master.

The procedure is carried out when the master is first powered on or when a new remote drop is being installed. It can also be initiated by a command from the Netcon controller. The control channel discussed above and shown schematically in FIG. 7b can also be used to permit a substantially continuous monitoring of propagation delay so that remote terminals can be adjusted and kept in sync.

Figure 9:
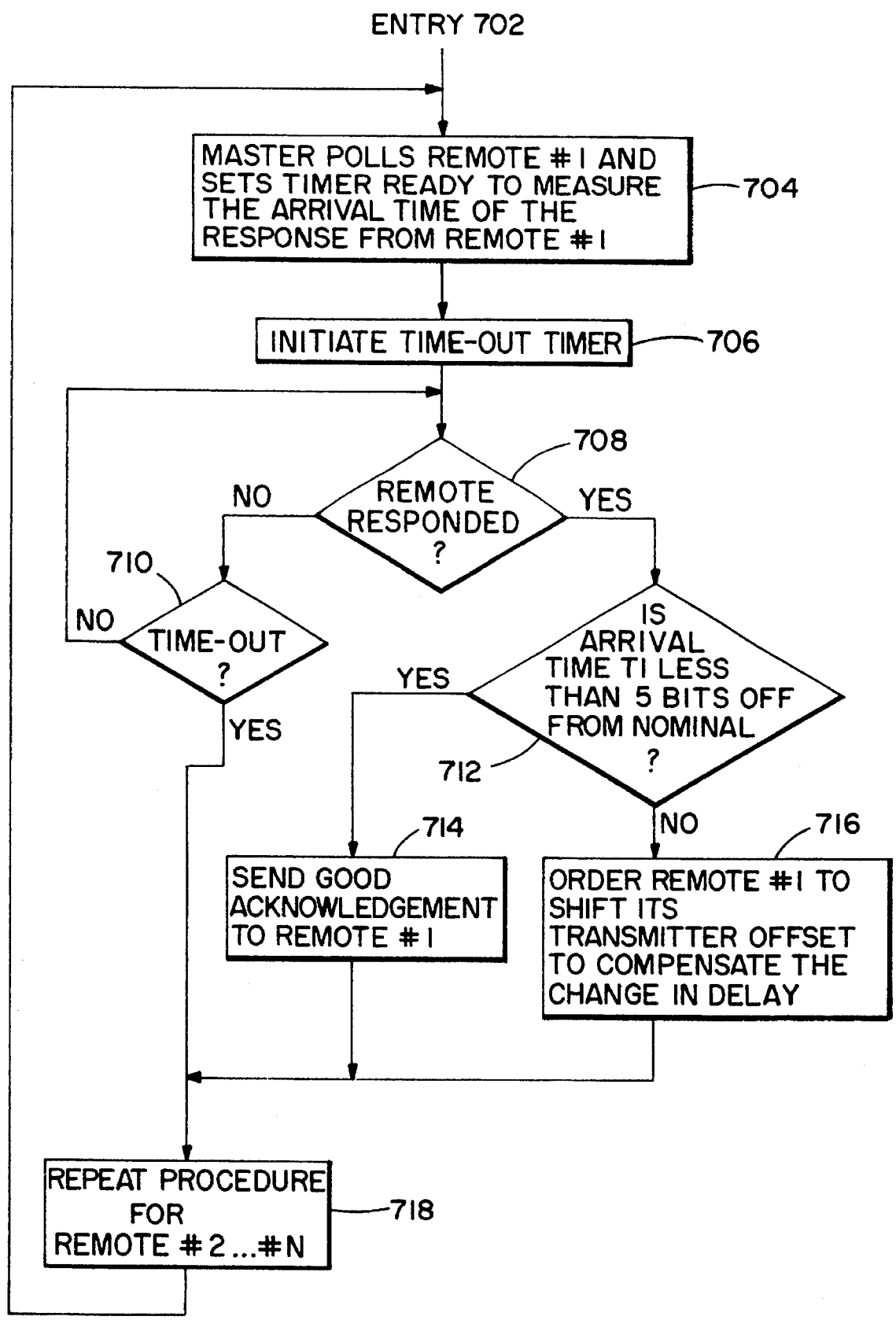
FIG. 9 is a flowchart of the delay monitoring process of the system.

FIG. 9 shows a flowchart of how the master monitors the propagation delay of the remote units and adjusts the transmitter offset of the remote units to compensate for change in delay. The master unit at 704 polls the first remote and sets a timer to measure the arrival time of the response from the first remote. The master also starts a time- out timer at 706. If no response at 708 is received from the first remote within the time-out interval at 710, the master skips to the next remote at 718. If a response is received at 708 before time-out at 710, the master calculates at 712 whether the arrival time is less than 5 bits (five aggregate clock periods) different from the nominal time associated with the first remote. If the arrival time is within 5 bits of the nominal time, the master at 714 sends a "good" acknowledgement to the first remote. If the arrival time is more than 5 bits different (either earlier or later) than the nominal time, the master at 716 orders the first remote to shift its transmitter offset to compensate for the change in delay. The master then at 718 repeats this procedure for all remotes.

This monitoring is slow but substantially continuous and it provides enough protection so that a determination can be made and corrective action taken before the system needs to be shut down due to errors.

The correction command is sent to the remote unit in the control information section of the outbound frame. Correction is not made unless the difference between the measured and nominal values of T1 is significant (preferably ≧5 bits) since small differences may be the result of a temporary glitch and not require corrective action.

As mentioned above, the outbound frame includes two control bytes in its header. These bytes are preferably constructed according to the table below:

| BYTE_1:- | Status Flags |
|---|---|
| bit 2–1, | (21) |
| | 00 = Not a Superframe |
| | 01 = Superframe A |
| | 10 = Superframe B |
| | 11 = Superframe C |
| bit 3, Not used | |
| bit 6–4, | (654) |
| | 000 = Next byte is Netcon data |
| | 001 = Next byte is Aux. Ch data |
| | 011 = Next byte is Ctl data |
| | 101 = Next byte is Start of Ctl data |
| | 110 = Next byte is End of Ctl data |
| bit 7, | 0 = Unit is a Diagnostic Remote, as set by DSU |
| | 1 = Unit is a Diagnostic Master, as set by DSU |
| bit 8, | 0 = Expects Constant Receive Carrier |
| | 1 = Expects Switched Receive Carrier |
| BYTE_2:- | Netcon, Aux'y Channel or Control data |

The first byte is used as a status indicator. It specifies whether the second byte is Netcon data, Auxiliary Channel data, or Control data and it indicates whether the current frame is a Superframe. In the case of a Superframe, status bits are also assigned to distinguish if it is a Superframe A, Superframe B, or Superframe C. The distinction is required to coordinate the inbound responses from the three separate sources mentioned above. Bit 7 indicates to the remote receiver, the unit's master/remote status as told by its DSU. Bit 8 lets the remote receiver know what receive carrier mode this unit expects. For example, if the remote receiver is to be used in a point to point mode, bit 8 is set to 1. However, for purposes of this invention, bit 8 is set to 0, as a constant carrier is expected from the master. Since each outbound frame carries only one byte of control data, a complete command may span a number of outbound frames and errors may be detected through the use of a checksum byte. Three bytes are available for inband communication in the 30 msec inbound frame. These bytes are preferably constructed according to the table below:

| BYTE_1:- | Status Flags. |
|---|---|
| bit 3–1, | (321) |
| | 000 = Next byte is a Netcon character |
| | 001 = Next two bytes are Netcon char's |

|        |                                              |
|--------|----------------------------------------------|
|        | 010 = Next byte is Aux'y Channel data        |
|        | 011 = Next two bytes are Aux Channel data    |
|        | 100 = Next byte is Control data.             |
|        | 101 = Next two bytes are Control data.       |
| bit 8–4, | Not assigned                               |
| BYTE_2:- | Netcon, Auxiliary Channel or Control data  |
| BYTE_3:- | Netcon, Auxiliary Channel or Control data  |

The master normally addresses each remote by its Drop Number. Responses from the remote to the master are always two bytes at a time.

As will be appreciated, the guard band is a critical aspect of this invention. During the guard band, the remote DSUs can inform the OCUs to which they are coupled whether they will be sending data or not in, the time slot following the guard band. This information is then used by the OCU to inform the MJU of the same so that the MJU can shut off the OCU data input to the MJU if the OCU is not sending data. In this manner, the "data mode idle" discipline is avoided and the system is not susceptible to noise. By sending the "control mode idle" command in the guard band (as well as in the non-data carrying time-slot following the guard band), any lagging response by the OCU can be compensated for. Moreover, the guard band also guards against errors which would otherwise result from a change in the delay from a remote terminal to the master. With the guard band, should data from one OCU be received slightly earlier or later than expected, it will not conflict with data from another remote terminal. In other words, the untimely OCU will, because of the guard band, begin transmission with 21 bits of marks (the guard band) and will simply put the untimely OCU from control mode idle into data mode idle. If data is received during the transmission of a guard band, signaling that delay from a remote terminal has changed, the master microprocessor will determine that there has been a change. Furthermore, as previously described, the system is provided with monitoring means in the control signalling in order to determine which remote terminal has changed its delay.

There have been described and illustrated herein digital multiport multidrop systems. While particular embodiments of the invention have been described, it is not intended that the invention be limited thereby, as it is intended that the invention be as broad in scope as the art will allow. Thus, it is understood by those skilled in the art that while a guard band has been described as preferably having twenty-one bits, it will be appreciated that a guard band having a different number of bits can be used, provided there is enough time for the DSU to communicate to the OCU (and the OCU to the MJU) that no data will be sent from that DSU during the next slot in the frame. Also, while particular hardware and software arrangements have been provided, it will be appreciated that one, the other, or both can be suitably changed, but will still provide the same guard band, monitoring, and other functions. Therefore, it will be appreciated by those skilled in the art that yet other modifications could be made to the provided invention without deviating from its spirit and scope as so claimed.

We claim:

1. A component for use in a digital multiport multidrop system having at least one host terminal connected through a data service unit to a telecommunications network having at least two office channel units (OCUs) and a plurality of remote terminals connected to the telecommunications network through the OCUs via data service units whereby the host and remote terminals may communicate, the telecommunications network including at least one multiple junction unit (MJU) coupled to the OCUs, each OCU informing the MJU whether the OCU is sending data when the OCU receives an appropriate signal from a respective data service unit, said component comprising:

a multiplexer/demultiplexer for multiplexing outbound signals from the host terminals to the remote terminals and for demultiplexing inbound signals from the remote terminals to the host terminals; and a microprocessor for controlling said multiplexer/demultiplexer so that outbound signals are multiplexed according to a first frame and inbound signals are demultiplexed according to a second frame, wherein said second frame is arranged such that a packet of data from a first one of said remote terminals is followed by a first guard band, followed by a packet of data from a second one of said remote terminals, followed by a second guard band, and said guard bands comprising at least one byte representing no data transmission and including the appropriate signal for the data service unit to send to the OCU so that the OCU informs the MJU whether the OCU is sending data.

2. A component according to claim 1, wherein:

said second frame includes inbound control information and said microprocessor monitors said inbound control information to determine whether time delays of said remote terminals have changed.

3. A component according to claim 2, wherein:

said first frame includes outbound control information and said outbound control information is used to adjust time delays of said remote terminals.

4. A component for use in a digital multiport multidrop system having at least one host terminal connected through a data service unit to a telecommunications network having at least two office channel units (OCUs) and a plurality of remote terminals connected to the telecommunications network through the OCUs via data service units whereby the host and remote terminals may communicate, the telecommunications network including at least one multiple junction unit (MJU) coupled to the OCUs, each OCU informing the MJU whether the OCU is sending data when the OCU receives an appropriate signal from a respective data service unit, said component comprising:

a multiplexer/demultiplexer for multiplexing inbound signals from the remote terminals to the host terminals and for demultiplexing outbound signals from the host terminals to the remote terminals; and a microprocessor for controlling said multiplexer/demultiplexer so that outbound signals are demultiplexed according to a first frame and inbound signals are multiplexed according to a second frame, wherein said second frame is arranged such that a packet of data from a first one of said remote terminals is followed by a first guard band, followed by a packet of data from a second one of said remote terminals, followed by a second guard band, and said guard bands comprising at least one byte representing no data transmission and including the appropriate signal for the data service unit to send to the OCU so that the OCU informs the MJU whether the OCU is sending data.

5. A component according to claim 3, wherein:

said second frame includes control information.

6. A component according to claim 4, wherein:

each said guard band comprises at least two bytes.

7. A component according to claim 6, wherein:

each bit of said two bytes has the same value.

8. A component according to claim 4, wherein:

each said guard band comprises at least twenty-one bits.

9. A component according to claim 8, wherein:

each bit of said twenty-one bits has the same value.

10. A digital multiport multidrop system having at least one host terminal connected through a data service unit to a telecommunications network having at least two office channel units (OCUs) and a plurality of remote terminals connected to the telecommunications network through the OCUs via data service units whereby the host and remote terminals may communicate, the telecommunications network including at least one multiple junction unit (MJU) coupled to the OCUs, each OCU informing the MJU whether the OCU is sending data when the OCU receives an appropriate signal from a respective data service unit, said system comprising:

a first multiplexer/demultiplexer for multiplexing outbound signals from the host terminals to the remote terminals and for demultiplexing inbound signals from the remote terminals to the host terminals;

a first microprocessor for controlling said first multiplexer/demultiplexer so that outbound signals are multiplexed according to a first frame and inbound signals are demultiplexed according to a second frame;

a second multiplexer/demultiplexer for multiplexing inbound signals from the remote terminals to the host terminals and for demultiplexing outbound signals from the host terminals to the remote terminals; and a second microprocessor for controlling said second multiplexer/demultiplexer so that outbound signals are demultiplexed according to a first frame and inbound signals are multiplexed according to a second frame, wherein said second frame is arranged such that a packet of data from a first one of said remote terminals is followed by a first guard band, followed by a packet of data from a second one of said remote terminals, followed by a second guard band, and said guard bands each comprise at least one byte representing no data transmission and including the appropriate signal for the data service unit to send to the OCU so that the OCU informs the MJU whether the OCU is sending data.

11. A system according to claim 10, wherein:

said second frame includes inbound control information and said first microprocessor monitors said inbound control information to determine whether time delays of said remote terminals have changed.

12. A system according to claim 11, wherein:

said first frame includes outbound control information and said outbound control information is used to adjust time delays of said remote terminals.

13. A system according to claim 12, wherein:

said second frame includes control information.

14. A system according to claim 10, wherein:

each said guard band is at least two bytes.

15. A system according to claim 14, wherein:

each bit of said two bytes has the same value.

16. A system according to claim 10, wherein:

each said guard band is at least twenty-one bits.

17. A system according to claim 16, wherein:

each bit of said twenty-one bits has the same value.

18. A component according to claim 4, wherein:

said appropriate signal comprises a bipolar violation when said OCU is not sending data and a plurality of marks when said OCU is sending data.

19. A system according to claim 10, wherein:

said appropriate signal comprises a bipolar violation when said OCU is not sending data and a plurality of marks when said OCU is sending data.

20. A component according to claim 1, wherein:

said appropriate signal comprises a bipolar violation when said OCU is not sending data and a plurality of marks when said OCU is sending data.

* * * * *